Patented Oct. 17, 1922.

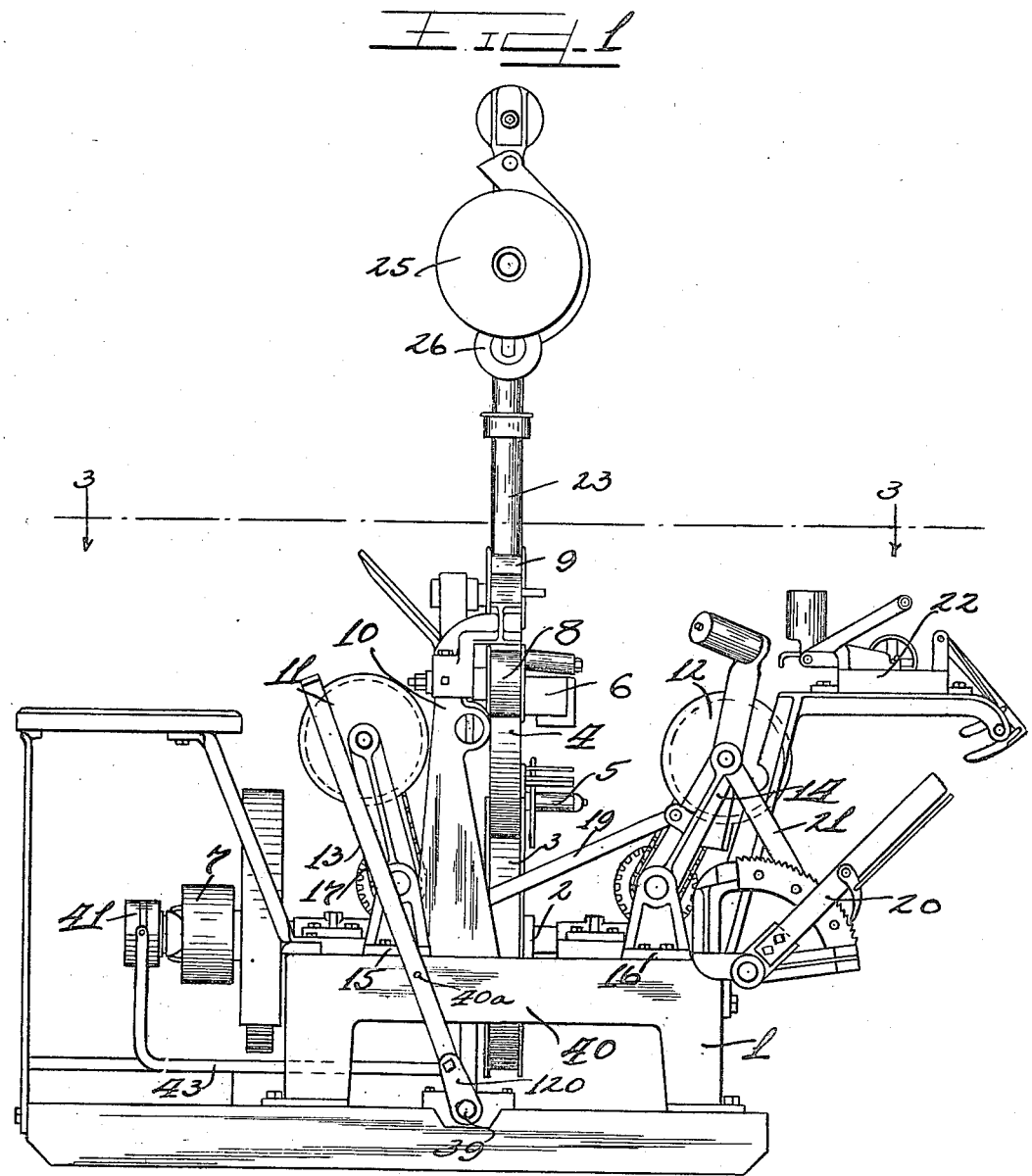

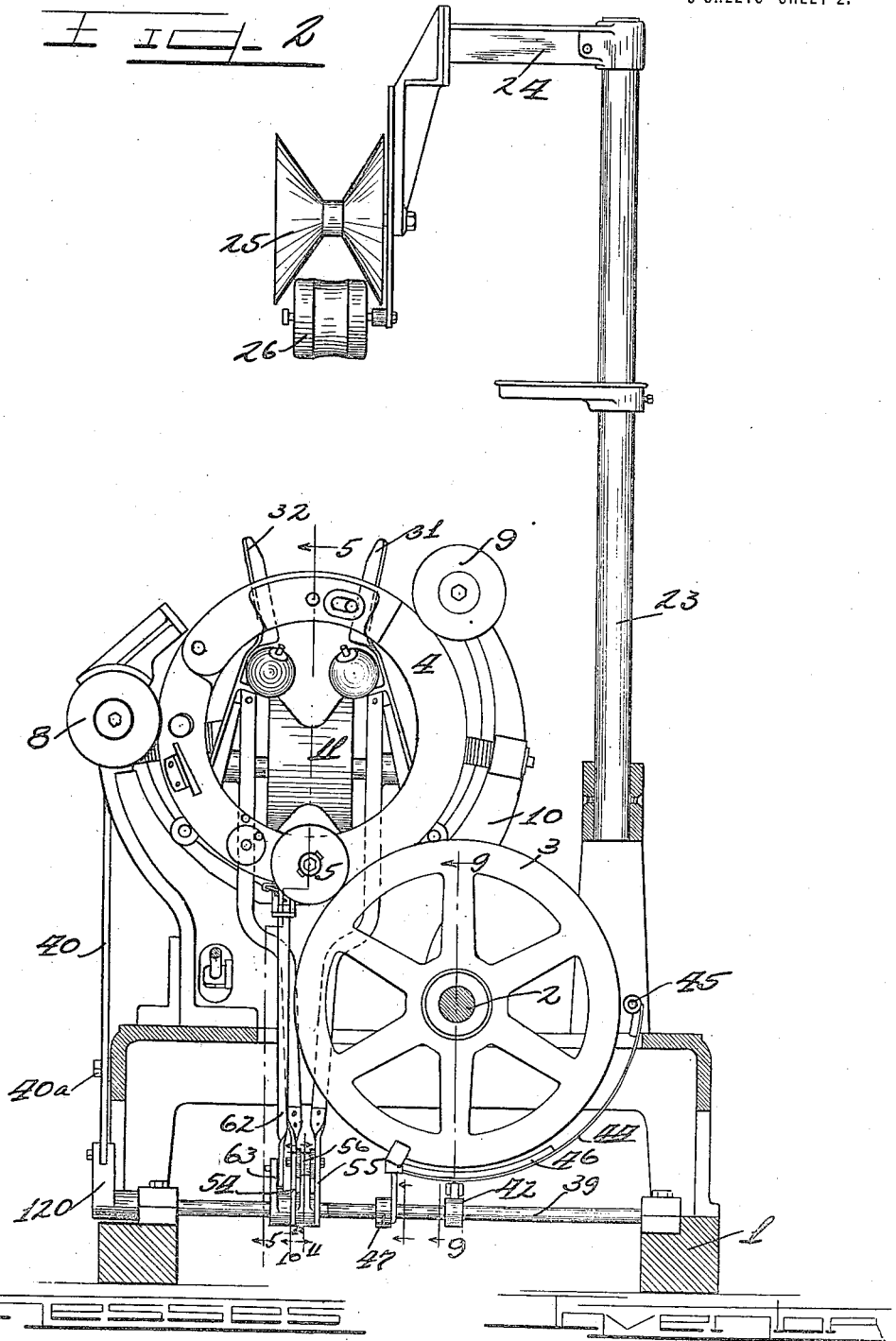

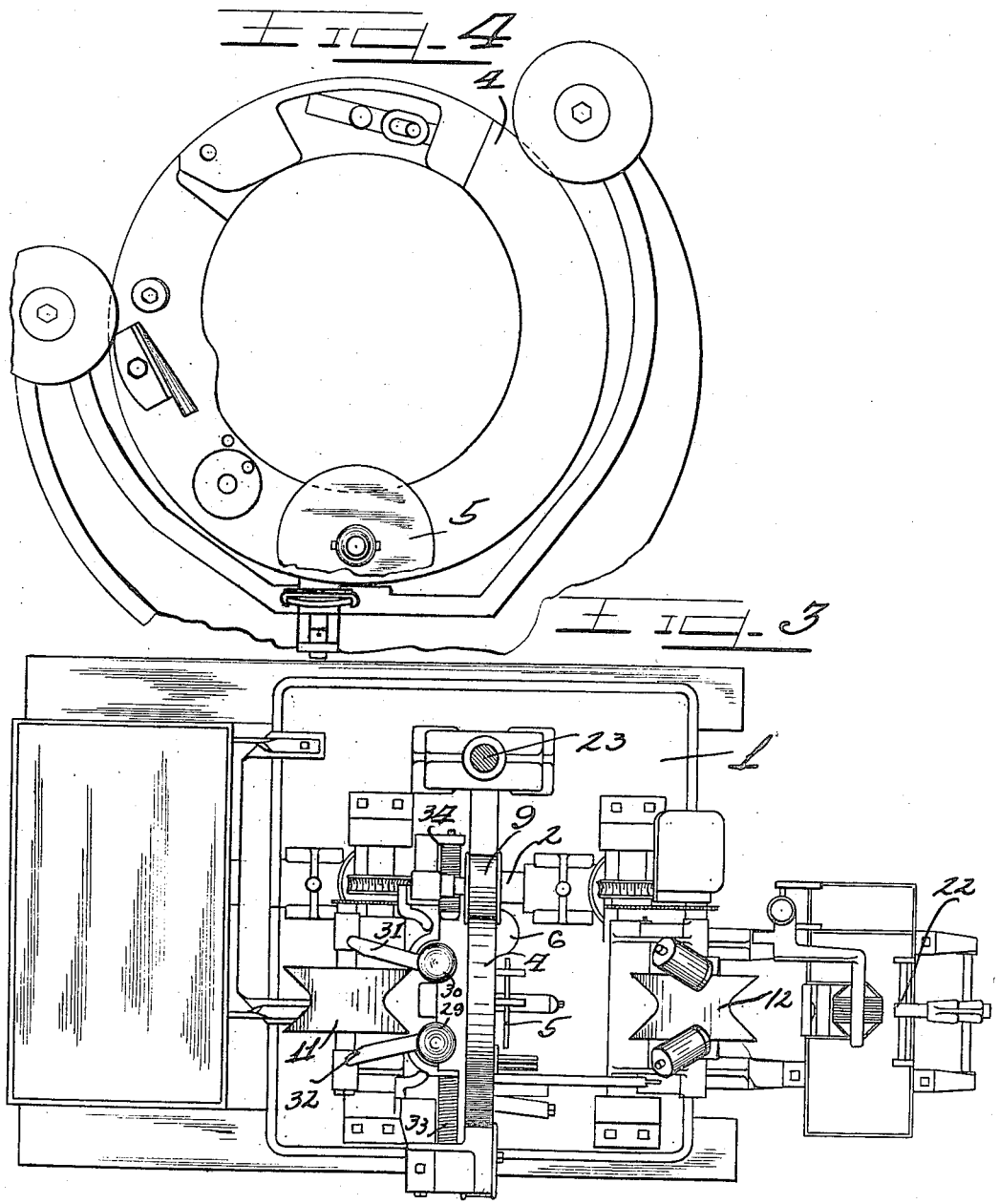

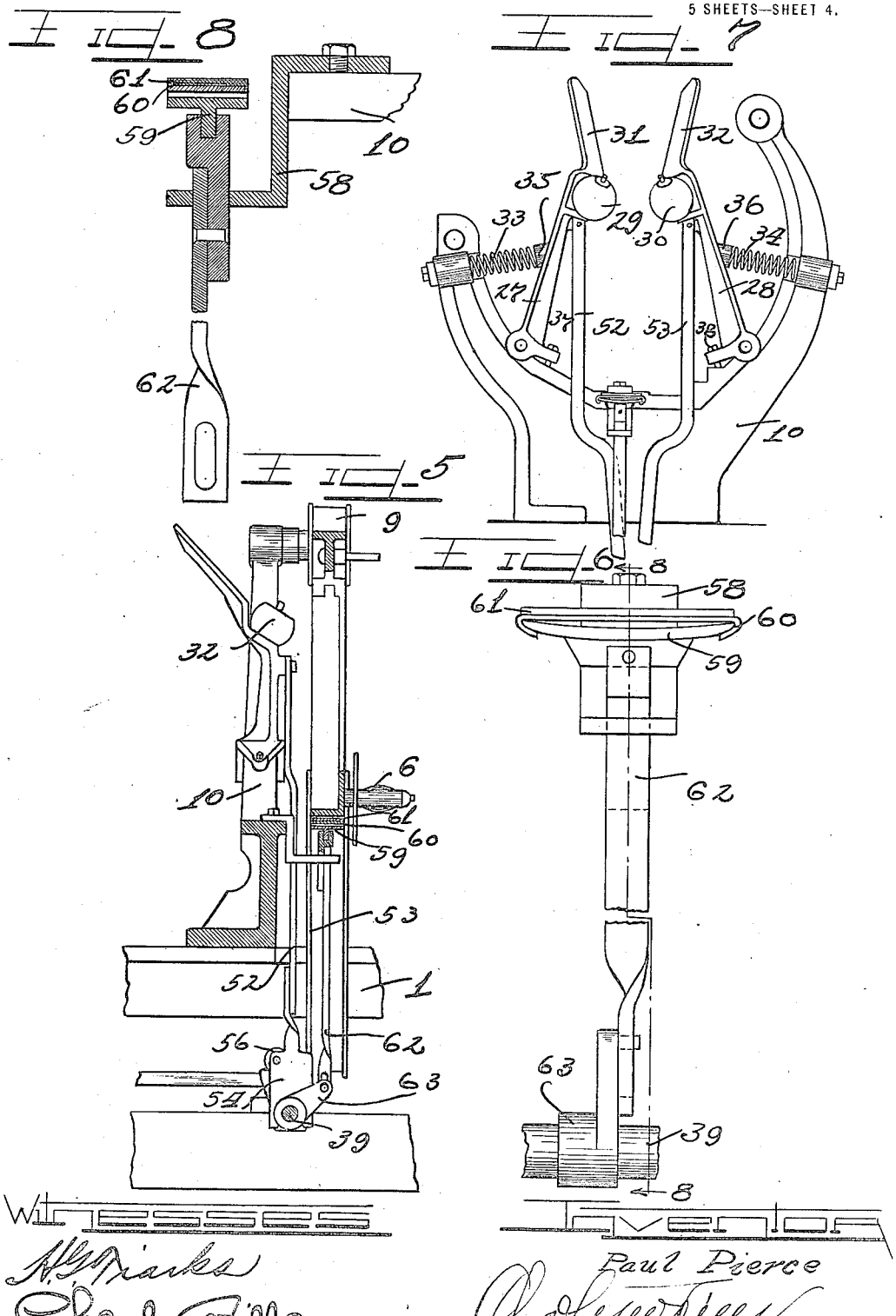

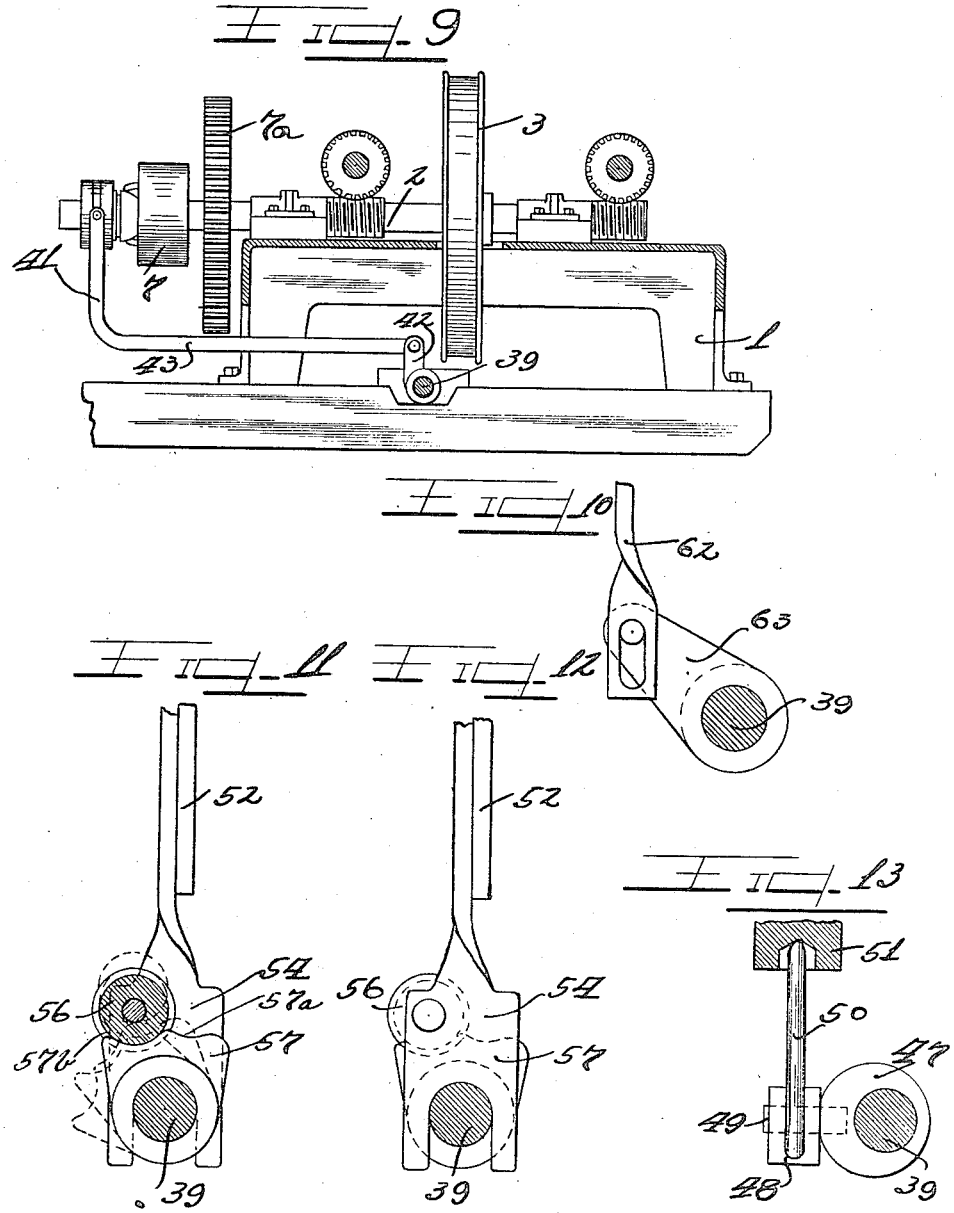

1,432,034

UNITED STATES PATENT OFFICE.

PAUL PIERCE, OF CHICAGO, ILLINOIS.

WRAPPING MACHINE.

Application filed September 15, 1920. Serial No. 410,404.

*To all whom it may concern:*

Be it known that I, PAUL PIERCE, a citizen of the United States, and a resident of the city of Chicago, in the county of Cook and State of Illinois, have invented certain new and useful Improvements in a Wrapping Machine; and I do hereby declare that the following is a full, clear, and exact description of the same, reference being had to the accompanying drawings, and to the numerals of reference marked thereon, which form a part of this specification.

This invention relates to a control mechanism for wrapping machines.

In order to protect automobile tire casings from injury during the time intervening between their manufacture and use, it is necessary to provide the same with a protecting cover. This cover generally comprises paper or other flexible material which is spirally applied upon the tire by means of a tire wrapping machine. It is of course desirable from a production standpoint to operate these machines at a high rate of speed and such high speed operation necessarily requires an effective convenient control mechanism.

It is an object therefore of this invention to provide a wrapping machine adapted for high speed operation and having mechanisms whereby the operation thereof may be conveniently controlled.

It is also an object of this invention to provide a tire wrapping machine having means for pressing the beads of a tire inwardly during the process of wrapping and having a control mechanism for releasing said bead pressing mechanism and stopping the machine.

It is another object of this invention to provide a high speed wrapping machine having separate braking mechanisms for the drive wheel and shuttle thereof, and having a single lever for controlling said braking mechanisms.

It is an important object of this invention to provide a wrapping machine wherein a plurality of controls necessary for the operation of the machine are operatable by a single lever.

Other and further important objects of this invention will be apparent from the disclosures in the specification and the accompanying drawings.

The invention (in a preferred form) is shown on the drawings and hereinafter more fully described.

On the drawings:

Figure 1 is a view in elevation of a wrapping machine embodying the principles of this invention.

Figure 2 is a transverse central section therethrough with parts in elevation.

Figure 3 is a section on the line 3—3 of Figure 1.

Figure 4 is a front elevation of the shuttle.

Figure 5 is an enlarged fragmentary section on the line 5—5 of Figure 2.

Figure 6 is an enlarged fragmentary elevation of the shuttle braking mechanism.

Figure 7 is an enlarged elevation of the shuttle frame.

Figure 8 is a section on the line 8—8 of Figure 6.

Figure 9 is a section on the line 9—9 of Figure 2.

Figure 10 is a slightly enlarged section on the line 10—10 of Figure 2.

Figure 11 is a slightly enlarged section on the line 11—11 of Figure 2.

Figure 12 is a slightly enlarged section showing the controlling cam.

Figure 13 is a slightly enlarged section showing the universal connection to the brake for the driving pulley.

As shown on the drawings:

An assembled view of the wrapping machine of this invention is shown in Figure 1, and generally described said machine consists of a base 1, provided with suitable bearings in which a drive shaft 2 is mounted. The drive shaft 2 is driven from a pulley 7 mounted thereon, and is provided with a friction driving wheel or pulley 3, into which a revolvable shuttle 4 engages to be driven thereby. Said shuttle carries reel 5 of wrapping material, preferably paper, which is spirally applied on the tire in overlapping relation, as shown in Figure 4. Said rotatable shuttle 4 is not only supported on the driving friction wheel 3 but also upon idler driving wheels or rollers 8 and 9 respectively which are mounted upon the extremities of a curved U-shaped frame 10 secured upon the base 1.

Means are provided for supporting a tire which is to be wrapped and rotating the same through the eye of the shuttle 4. For this purpose grooved rolls 11 and 12 are provided and said grooved rolls are pivotally supported on arms 13 and 14 which are pivoted in brackets 15 and 16 bolted to the frame 1. For rotating said rolls 11 and 12, chain and sprocket mechanisms 17 and 18, which are driven from worm gear mechanisms associated with the shaft 2, are provided. In order that said rolls 11 and 12 may be adjusted to support tire casings of different sizes, the arms 13 and 14 are connected by links 19 pivoted thereto and the arm 14 is connected by link 21 with a lever 20 whereby rocking said lever 20 acts to shift the rolls 11 and 12 simultaneously inwardly or outwardly toward or from the shuttle 4. In order that the proper relation between the tire and the shuttle may be maintained, this simultaneous adjustment of the supporting rolls 11 and 12 is essentially a differential one.

A mechanism 22 is also provided whereby a peripheral binding strip may be adhesively secured to the outside of the wrapping after it is applied, but since said mechanism forms no part of this invention, it will not be specifically described herein.

To provide for guiding and aligning the upper portion of the tire casing which is being wrapped and to provide for pressing the peripheral strip on the wrapping, an upright column 23 is mounted on the base 1 and pivoted on an arm 24 on said column 23 is an upper guiding roller 25 and a presser roller 26. Said presser-roller 26, which preferably comprises resilient material, acts to press the peripheral binding strip against the outside of the wrapping.

To insure tight wrapping of the tire casing it is necesary that the beads thereof be pressed inwardly when the wrapping is being applied. Means are accordingly provided for pressing the beads inwardly and said means comprise arms 27 and 28 which are pivotally mounted on the inside of the shuttle frame 10 as shown in detail in Figure 7. Revolvably carried by said arms 27 and 28 are bead-pressing rollers 29 and 30, and integral extensions 31 and 32 of said arms extend outwardly and above said bead-pressing rollers and serve to guide the tire casing into position when it is being placed in the machine. For holding said bead-pressing rollers 29 and 30 inwardly against the tire which is being wrapped, coil springs 33 and 34 are provided, the outer ends of said springs being secured in the shuttle frame 10 and the inner ends thereof being engaged against the bosses 35 and 36 on the arms 27 and 28. Set screws 37 and 38, which are engaged through inwardly extending bosses on the lower ends of the arms 27 and 28, engage the inner face of the shuttle 10 and may be adjusted to limit the inner movement of the bead-pressing rollers 29 and 30.

The wrapping machine of this invention is adapted to be operated at high speed and the various controls which are necessary in the operation of such a machine at high speed are controlled by a single lever and its control mechanisms will now be described.

A shaft 39 is journalled in suitable bearings in the lower portion of the base 1, extending transversely thereof as shown in Figures 1 and 2, and on the ends of a crank 120 on the outer end of the shaft, an upwardly extending lever 40 is pivotally connected. Said lever 40, which is in turn pivoted on the frame at a point 40ª intermediate its ends and is adapted to control a plurality of mechanisms which will now be described.

In order to set the various mechanisms in motion it is necessary that the shaft 2 be connected with the pulley 7 or the gear 7ª by throwing into engagement a suitable clutch 41 which is controlled by said lever 40. For connecting said lever 40 to the clutch 41, an angle connecting link 43 is provided and said connecting link at its inner end is pivotally connected to a crank arm 42, secured to the shaft 39 intermediate the ends thereof. Consequently a rotation of the shaft 39 acts to actuate said crank arm 42 and to throw the clutch 41 into or out of engagement by means of the connecting link 43.

A brake mechanism which is provided for the driving pulley 3 is also controlled by the lever 40 and acts to stop the rotation of the said pulley 3 when the clutch 41 is thrown out of engagement. Said brake mechanism comprises a brake frame or band 44 which is pivoted on the frame 1 at 45 and which is provided with a friction surface 46 which is adapted to engage the flanges on said driving pulley 3 and which is brought into engagement with said flanges by mechanism mounted on the shaft 39. Said mechanism comprises an eccentrically mounted boss 47 which is secured to said shaft 39 and to which is pinned a block 48 by means of a pin 49 extending through said block into the band 44.

Pivotally engaged in said boss 48 is an arm 50 which extends upwardly and engages in a pointed recess in a block 51 secured to the inner end of the band 44. It is thus apparent that on account of the pivotal connections between the boss 47 and the block 51, a universal connection is in effect provided.

It is also desirable that means be provided for disengaging the bead-pressing rollers 29 and 30 when the machine is stopped. Since said bead-pressing rollers are normally held inwardly by the coil springs 33 and 34, it is of course necessary to compress said springs in order to move the arms 27 and 28 outwardly to release the rollers from the beads of the tire which is being wrapped. Mechanisms which are provided for forcing said arms 27 and 28 outwardly are controlled by the lever 40 from the shaft 39 and are shown in detail in Figures 5, 7, 11 and 12. Arms 52 and 53 are pivotally connected to the arms 27 and 28 on the inner side thereof, directly beneath the bead-pressing rollers 29 and 30 and said arms extend downwardly through an opening in the base 1 where they are secured to forked members 54 and 55 which are twisted at right angles to said arms 52 and 53 and are engaged over the shaft 39, as clearly shown in Figures 11 and 12. Said members 54 and 55 are connected by a roller 56 which is pivoted therebetween and a cam 57 which is shown in Figures 11 and 12, secured to the shaft 39 between said forked members, is adapted to engage the roller 56, to raise said forked members and the arms 52 and 53 upwardly when the shaft is rotated. This upward movement of the arms 52 and 53 of course acts to force the arms 27 and 28 outwardly to release the bead-pressing rollers 29 and 30 from their engagement with the tire which is being wrapped.

On account of the form of the cam 57 the first movement of the shaft 39 positively disengages the rollers 29 and 30 from the beads of the tires, while subsequent movement thereof forces the roller 56 further upward and completely disengages the roller from the tire.

When the clutch 41 is released and the driving pulley is stopped and the bead-pressing rollers 29 and 30 are released, the high speed of rotation of the shuttle 4 causes said shuttle to continue rotating and it is therefore desirable that means be provided for stopping the rotation of the same after the clutch has been disengaged and the bead-pressing rollers released. A suitable brake mechanism is provided for this purpose and is operated by the shaft 39 and controlled by the lever 40. Said brake mechanism, which is shown in detail in Figures 4, 5, 6, 8 and 10, is mounted adjacent the lower part of the shuttle frame 10 and is supported on a bracket 58 secured thereto. A shoe 59, which is slidably mounted on said bracket 58, is of substantially the curvature of the outer portion of the shuttle 4, and has engaged thereover a spring metal band 60 which is provided with a friction surface 61 adapted to engage the outer face of the shuttle. A connecting link 62 has its upper end secured to said shoe 59 and has its lower end pivotally connected by means of a slot in connection with a crank 63, which is secured to the shaft 39, as clearly shown in Figures 5 and 6. Said slot and pin connections of course allow a certain amount of movement of the shaft 39 to take place before the brake mechanism is applied to the shuttle 4. Thus the clutch 41 is disengaged and the brake applied to the driving pulley 3 and the bead-pressing rollers 29 and 30 are disengaged before the shuttle brake is applied.

Attention is here directed to the particular shape of the top of the cam 57, which is clearly shown in Figure 11. It will be noted that said cam is formed with two depressions 57$^a$ and 57$^b$ in the top thereof, said depressions being separated by a rounded higher central portion. When the machine is stopped the lever 40 is moved until the depression 57$^a$ is engaged under the roller 56 whereby the shuttle brake is applied. As soon, however, as the lever is released the springs 33 and 34 exert sufficient force on the roller 56 to move the same into the depression 57$^b$ where it normally rests when the machine is not running. This arrangement provides means whereby the lever 40 is maintained in proper position and whereby the shuttle brake is released after the machine has been stopped to permit of convenient manipulation of the shuttle.

On account of the arrangement of the cam and the slot connections heretofore described, the various braking and disengaging operations are effected in a proper time relation and it is possible to quickly stop the machine when it is operating at a high rate of speed, remove the wrapped tire therefrom and insert the tire which is to be wrapped.

The operation is as follows:

When the machine is stopped the lever 40 is in such a position that the bead-pressing rollers 29 and 30 are disengaged from the beads of the tire therein, the clutch 41 is disengaged and the brakes 44 and 59 are respectively applied to the driving pulley 3 and the shuttle 4. The tire which is to be wrapped is rolled onto the supporting rolls 11 and 12 from a suitable platform, a hinged portion of the shuttle 4 being opened for said purpose and after said tire is in proper position, wrapping material from the reels 5 is engaged thereon and the machine is started operating by actuating the lever 40. The initial movement of said lever 40 acts to release the cam 57 from its engagement with the roller 56 and to allow the bead-depressing rollers 29 and 30 to firmly engage the beads of the tire. Further movement of the lever brings the clutch 41 into engagement and releases the brake 44 allowing the shaft 2 and the driving pulley 3 to rotate. Further movement of the lever of course brings the slot and pin connection between the connecting links 62 and the crank arm 63 into operation and releases the shuttle brake allowing the shuttle to rotate and on account of the relative rotation of the tire which is being wrapped and the shuttle 4, a spiral wrapping is applied on the tire.

The reverse of the operation just described of course takes place when the machine is stopped and it is apparent that the various mechanisms provided are not only easily controlled by the lever but that they also adapt the machine for high speed operation, which is so desirable from the standpoint of production. The various mechanisms of this invention are shown and described in connection with a particular type of tire wrapping machine, but it is clearly apparent that they may be successfully used on various wrapping machines of the same general type.

I am aware that numerous details of construction may be varied through a wide range without departing from the principles of this invention, and I therefore do not purpose limiting the patent granted otherwise than necessitated by the prior art.

I claim as my invention:

1. In a tire wrapping machine, means for rotatably supporting a tire to be wrapped, a wrapping material carrier rotatable through the eye of the tire, means for pressing the beads of the tire to be wrapped, mechanisms for stopping the rotation of the tire and of the wrapping material carrier, and a single lever for controlling said stopping mechanisms and pressing means.

2. In a tire wrapping machine, tire supporting and wrapping mechanisms, means for connecting said mechanisms with a source of power, a plurality of means for braking said mechanisms, and a single lever for controlling said connecting and braking means.

3. In a tire wrapping machine, tire supporting and wrapping mechanisms, means for connecting said mechanisms with a source of power, a plurality of means for braking said mechanisms, and a unitary control for said connecting and braking means.

4. In a tire wrapping machine, the combination with tire supporting and wrapping mechanisms, control means for starting and stopping the same of means for pressing the beads of the tire that is being wrapped, and a cam-controlled mechanism operated by said control means for releasing said pressing means.

5. In a tire wrapping machine, the combination with tire supporting and wrapping mechanisms, control means for starting and stopping the same of adjustable spring-impelled means for pressing the beads of the tire that is being wrapped, and a cam-controlled mechanism operated by said control means for releasing said pressing means.

6. In a wrapping machine, the combination with a frame, of a shuttle rotatably mounted thereon, driving means for the shuttle, a brake for the shuttle, a brake for the driving means, a shaft journalled in the frame, a lever for rotating the shaft, and means on the shaft for operating the brakes for the shuttle and the driving means.

7. In a wrapping machine, a rotatable shuttle, a drive therefor, separate brakes for the shuttle and the drive, and a unitary control mechanism for applying brakes successively.

8. In a wrapping machine, a rotatable shuttle, a drive therefor, separate brakes for the shuttle and the drive, operating means for the brakes, and a universal connection between said operating means and the brake for the drive.

9. In a wrapping machine, a rotatable shuttle, a drive therefor, a brake for the shuttle, a control mechanism for the brake and the drive, and a lost motion connection between said control mechanism and the shuttle brake whereby the control to the brake and the drive is applied in the proper time relation.

10. In a wrapping machine, a rotatable shuttle, a drive therefor, separate brakes for shuttle and drive, a unitary control mechanism for the drive and brakes, and means associated with said control mechanism for releasing the shuttle brake after the machine is stopped.

In testimony whereof I have hereunto subscribed my name in the presence of two subscribing witnesses.

PAUL PIERCE.

Witnesses:
 EARL M. HARDINE,
 CARLTON HILL.